United States Patent Office 3,107,421
Patented Oct. 22, 1963

3,107,421
METHOD OF JOINING ENAMEL LINED PIPES
Frederick W. Turnbull, Chevy Chase, Md.
(1317 F St. NW., Washington 4, D.C.)
Original application Feb. 12, 1953, Ser. No. 336,597.
Divided and this application Feb. 6, 1959, Ser. No. 791,700
1 Claim. (Cl. 29—471.1)

This invention relates to a pipe joint or coupling especially for a coupling for vitreous enamel or "glass" lined pipe, and is a division of application Serial No. 336,597, filed February 12, 1953, and now Patent No. 2,888,783.

In handling corrosive liquids it is desirable to use cheap pipe, but at the same time it is necessary to use pipe that will not be quickly corroded by the liquid in the pipe as such corrosion would not only destroy the pipe but also would adulterate the liquid. Pipe lined with "glass" or a vitreous enamel is available but the problem of satisfactory joints for lengths of the pipe has until the present invention not been solved.

It had been suggested that the ends of a pipe be prepared and a fitting be prepared the one to screw into the other and to provide abutting faces of pipe end and a shoulder in the fitting. Then some "liquid" enamel (i.e. enamel frit mixed with water) be placed on the shoulder and on the pipe end and the assemblage heated. This suggested process is not used even to make sub-assemblies in the shop and would be clearly impossible to use "in the field." The "liquid enamel" is a pulverulent and therefore comprises a high percentage of voids. When such "liquid enamel" is heated the voids form bubbles or pin holes, which, of course, obviate the benefit of the enamel material. Also as the "liquid enamel" is heated the moisture is dried out of it. If it is heated too quickly the liquid will vaporize and will dislodge the pulverulent material from between the opposing faces of the desired joint. Other problems too are presented, due to the fact that the two opposing faces cannot be forced together before melting the pulverulent enamel; the pipe and fitting are too hot while the enamel is fluid to make screwing the two together practical; and, upon cooling, twisting between the pipe and the fitting would again pulverize the bubbly enamel, if indeed they could be rotated at all.

The present invention, however, provides for fittings and a method of joining pipe to pipe, or pipe to fitting obviating the above difficulties.

Other means that have been suggested for joining enamel lined pipe include gaskets and other devices of resilient material, and have all the inherent defects of that type of joint and are not in anyway the equivalent of the present invention.

It is a primary object of the present invention to provide a method of making a pipe joint to join lengths of enamel lined pipe, or to join enamel lined pipe to fittings, such as elbows, etc., so as to give a continuous enamel surface toward the interior of the pipe so there is no break of continuity of the lining at the pipe joint.

A further object of the invention is to provide fittings for use in connection with the method, and especially fittings that facilitate the performance of the method.

Other and further objects and advantages will become apparent from the following specification, especially when taken with the accompanying drawings in which like characters of reference refer to similar parts in the several views and in which.

Figure 1:
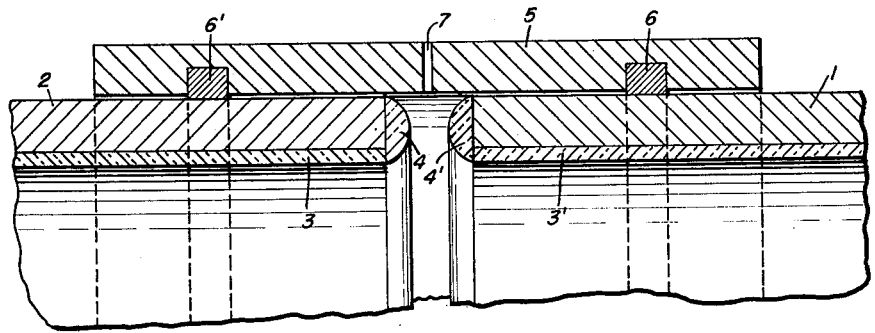
FIG. 1 is a fragmentary section of a pipe joint being assembled.

As seen in FIG. 1, it is desired to join pipes 1 and 2 to form a substantially longer passage for the flow of a corrosive fluid. These pipes, which may be cut lengths, are lined with a coating of enamel 3, 3' which was applied by the pipe manufacturer.

The ends of pipes 1 and 2 are, of course, cut off square so that in making the joint the ends will be equally spaced for the entire circumference.

On the ends of pipe 1 and pipe 2 there is applied a mass of enamel 4 and 4'. This mass of enamel is put in place by the method clearly described in Patent No. 2,888,783 referred to above. Care is taken in applying this enamel coating to cover the end of the linings 3 and 3' and may, of course, even overlap the lining along the pipe. The object is to provide a mass of enamel free of pin holes and making an impervious union with the lining 3 or 3'. This mass of enamel, that may be said to have the shape of a meniscus, is solid enamel and is not a pulverulent or frit mixed with a vehicle.

In FIG. 1 a sleeve 5 is provided into which the ends of pipes 1 and 2 may be inserted and, to make the joint, the pipe ends are pushed beyond the points shown in FIG. 1 until meniscus 4 and meniscus 4' contact. The point at which they contact is preferably at about the plane of one or more vent holes 7. Instead of one line of vent holes, however, two lines spaced slightly to each side of the intended joint may be provided. The reason for these vents is so that any pressure that may build up between sleeve 5 and pipes 1 and 2 may be vented so that it will not deform the enamel at the pipe ends which, as will be seen below, will be a viscous fluid during the formation of the joint.

Sleeve 5 is provided interiorly at each end with a ring of a solder 6, 6' in an annular groove. Pipe joints or couplings provided with such annular grooves and solder are, of course, known and are some times called "sweat type of fittings," but the solder of the present device must be selected to have a melting point at least as high as required to cause the enamel of the menisci to become viscous.

The pipe ends, inserted in the sleeve 5 are pressed together, the outside of pipes 1 and 2 having been cleaned and having had a coating of solder flux applied. A heating device, such as a blow torch or the like, is used to heat the sleeve 5 and, of course, pipe ends 1 and 2.

Figure 2:
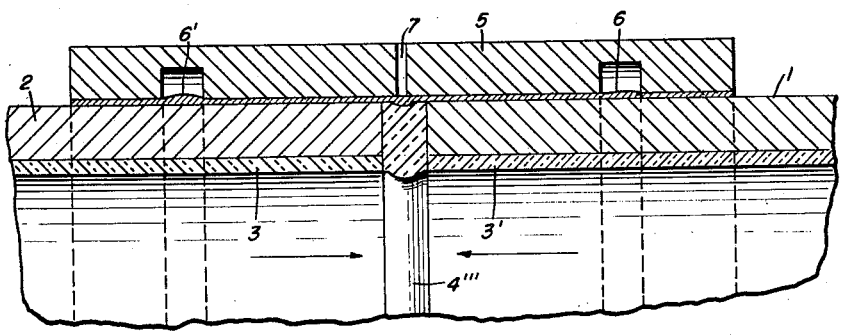
FIG. 2 is a similar view to FIG. 1 in which the joint has been completed.

When the metal elements 1, 2 and 5 are heated to the melting temperature of solder 6, the solder 6, 6' will flow and will solder pipes 1 and 2 securely to sleeve 5 in the known manner. The enamel forming the menisci 4 and 4' and the solder 6 must have melting points such that just before the solder 6, 6' flows the enamel will have become viscous. Melting of solder 6, 6' may, then, be an indicator to infer the operator that the joint is made. Pressure on the ends of pipes 1 and 2 may compress menisci 4, 4' into a solid ring 4''' as seen in FIG. 2. When it is noted that solder 6, 6' has flowed, heating is discontinued and the joint is complete.

The enamel used at 4, 4' has desirably a melting point lower than that of lining enamel 3, 3' but is also preferably of closely similar composition to that of lining 3, 3'.

It will be noted that pipe 1 can be inserted into fitting 5 and heated to a temperature to flow solder 6. This gives the equivalent of a fitting having a shoulder much like the fitting 5' described below, and the assemblage may be manipulated as described in connection with FIG. 3.

Figure 3:
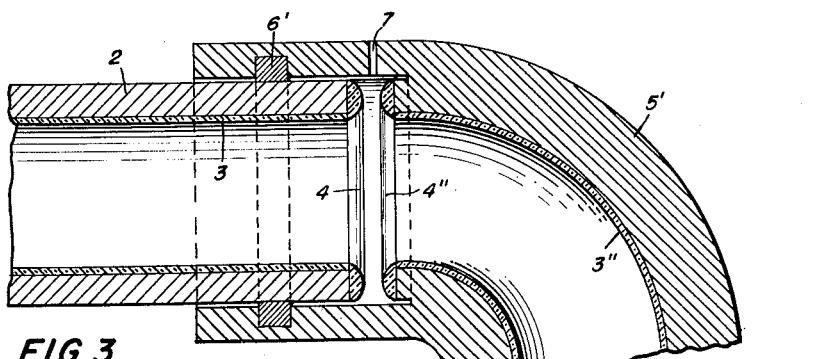
FIG. 3 is a fragmentary section similar to FIG. 1 of a pipe end being assembled in an elbow.

The joint of pipe 2 to an elbow 5' is seen in FIG. 3. It will be understood, of course, that element 5' might also be a valve, pump, or any other fitting required in a piping system. Fitting 5' is provided with a shoulder 8 to which a meniscus 4'' is applied. The end of pipe 2 with its meniscus 4 is inserted into the fitting 5', meniscus 4 is pressed against meniscus 4″ and the assemblage heated until, by the solder 6′ flowing, it is known that the enamel 4, 4″ has softened and has merged.

Preferably the pipe and fixture or the two lengths of pipe will move slightly as soon as the enamel 4, 4′ or 4, 4″ has softened. It will be noted, however, that if the menisci are in contact when they soften they will merge in any case due to the surface tension of the softened enamel. The amount of possible motion between the two elements being joined will be very little and will be determined by the height of the menisci.

The heights of menisci 4, 4′, 4″ in the drawings are shown, for purposes of illustration, as being greater than would probably be desirable.

The materials that may be used are exemplified by "glass alloy" made by Pfaudler Company, and "perma glass" made by A. O. Smith Company. There are, of course, many other companies manufacturing glass or enamel formulations, and the manufacturers can provide their formulations with any desired melting point. Solder (including silver solders and brazing metals) are readily obtainable having any selected melting point dependent on the alloy used. Appropriate alloys can be selected from hand books. The exact temperature of fusion of the solder is not material so long as it is sufficiently above the temperature at which the enamel becomes viscous so that, the enamel that must be softened being more remote from the source of heat of the solder, will, none the less have been softened before the solder flows.

It will be realized that the above description of my method of making a pipe joint and of a pipe coupling to facilitate the performance of the method is illustrative.

What I claim and desire to protect by Letters Patent is:

A method of joining ends of enamel lined pipe to provide continuity of enamel lining to the inside of the pipe comprising forming a solid meniscus of low melting point vitrified enamel on each of the ends of the pipe to be joined, inserting the pipe ends in a silver solder sweat type fitting, pressing the enamel coatings of the pipe ends together, and heating the fitting to the temperature required to complete the sweated joint whereby the enamel coatings on the pipe ends are softened and merge the one with the other.

References Cited in the file of this patent
UNITED STATES PATENTS

| | | |
|---|---|---|
| 1,497,396 | Wry | June 10, 1924 |
| 2,040,092 | Leedy | May 12, 1936 |
| 2,399,103 | Clinedinst | Apr. 23, 1946 |
| 2,469,772 | Johnson | May 10, 1949 |
| 2,888,783 | Turnbull | June 2, 1959 |